Patented Mar. 3, 1931

1,794,551

UNITED STATES PATENT OFFICE

EUGENE P. SCHOCH, OF AUSTIN, TEXAS

PROCESS OF EXTRACTING SALTS FROM MINERALS

No Drawing.   Application filed August 20, 1928.   Serial No. 300,959.

The present invention relates to methods of extracting desirable salts from minerals.

Certain minerals of which polyhalite having the formula $2CaSO_4, K_2SO_4, MgSO_4, 2H_2O$, may be taken as exemplary, occur in the United States in practically pure form in layers of about five feet thick, for example as found in the western part of Texas and also in New Mexico, and such minerals offer an economically important source for the recovery of potash salts. However, polyhalite has not been previously used for this purpose for reasons pointed out below.

When treated with cold or even with hot water, polyhalite decomposes very slowly, forming a very dilute solution of potassium and magnesium sulphates and a substantially insoluble residue of gypsum. Further the concentrations of the salts in the extracting solution cannot be increased by utilizing such extract for treatment of a fresh sample, because an equilibrium between the salts in solution and solids is reached when the solution is still very dilute. Furthermore, the time required for this reaction is quite considerable and even when using hot water, such time of contact must be from one to several hours.

In a laboratory suggestion in the prior art, it was proposed to heat the polyhalite before extraction as it was found that such heating increased the concentration of the salts in the extracting solution to about 4.3 parts in 100 parts of water. But since magnesium and potassium salts together have a solubility of about 33 grams per 100 c. c. of water at 25° centigrade, it is evident that the solution obtained in this manner is far from being saturated.

One reason why so much of the potassium sulphate and magnesium sulphate remain in the solid residue instead of dissolving is that such compounds as syngenite ($CaSO_4, K_2SO_4, H_2O$), pentasalt ($5CaSO_4, K_2SO_4, H_2O$), as well as polyhalite and perhaps other combinations will form whenever the concentrations of the soluble salts exceed certain values which are less than the solubilities of mixtures of potassium sulphate and magnesium sulphate, in the absence of calcium sulphate or gypsum; that is, it is the latter substance, namely calcium sulphate, which prevents increased concentrations of magnesium sulphate and potassium sulphate in the extracting solution. While it was to be expected that by extracting with hot water, the time for such extraction would be greatly reduced, it was not likely that the equilibrium would be displaced greatly thereby, so that concentrations would be expected to be obtained ultimately not greatly different from those obtained with cold water.

One of the objects of the present invention is the production of concentrated solutions of salts by the treatment of polyhalite and related minerals.

Other and further objects and advantages will appear from the more detailed description given below, it being understood, however, that various changes may be made in the invention disclosed herein, by those skilled in the art without departing from the scope and spirit of this invention.

In accordance with the present invention, it has been found that if minerals of the polyhalite type are heated and then subjected to extraction with hot or boiling water, concentrated solutions of soluble salts may be produced. In view of the substantial occurrence of polyhalite as a mineral, the invention will be illustrated by describing the treatment of that mineral.

But it should be understood that other minerals of a similar type such as krugite ($4CaSO_4, MgSO_4, K_2SO_4, 2H_2O$), may be utilized to obtain analogous results.

The following example illustrates the preferred method of procedure. Polyhalite was heated within an electric furnace to a temperature above 500° centigrade, for a sufficient length of time to allow all the water of crystallization to escape. This substantially dehydrated mineral was then desirably ground or pulverized and boiled with water for a short period of time, for example, considerably less than a half hour. The amount of water used was 100 parts of hot water to 100 parts by weight of dehydrated polyhalite and in one instance the boiling period lasted but for three minutes, after which the mixture was filtered. By successive extractions of the same portion of polyhalite, with fresh portions of water, it was found that substantially the entire potassium and magnesium sulphate contained in the dehydrated polyhalite could be removed, leaving calcium sulphate as a substantially insoluble residue.

The substantially complete recovery of potassium and magnesium sulphates from the dehydrated polyhalite is illustrated by the following data. 100 parts by weight of dehydrated polyhalite was extracted successively with 100 parts of hot water, the mixture being boiled in each instance and subsequently filtered, the residue from one extraction being used in the subsequent extraction. This extraction was repeated six times and the six filtrates showed the following weights, and on evaporation gave the corresponding residues set forth below:

| No. of operation | Parts by weight of filtrate | Parts by weight of residue from evaporation |
|---|---|---|
| 1 | 67.2 | 19.94 |
| 2 | 115.5 | 17.02 |
| 3 | 115.47 | 9.02 |
| 4 | 105.05 | 6.24 |
| 5 | 99.65 | 4.32 |
| 6 | 98.06 | 1.33 |
| Total |  | 57.87 |

The residue remaining after the sixth extraction was tested and found to be free from potassium. Since the theoretical amount of extracted salts would be 59 parts by weight, the recovery of 57.87 parts by weight may be taken as closely approximating the theoretical.

Then it was found that when several fresh portions of polyhalite all of which has been dehydrated by heating as above described were extracted successively with one and the same solution, the solution finally contained approximately 57 parts by weight of potassium and magnesium sulphate in 100 parts of hot water, and upon cooling the solution, about two-fifths of its saline contents in the form of schoenite ($MgSO_4$, $K_2SO_4$, $6H_2O$) separated. For example, a solution containing 37 grams of potassium and magnesium sulphates in 87 parts by weight of water and which corresponds in composition with the first extract obtained by treating 100 parts of polyhalite with 100 parts of water as set forth above, was used to extract another portion of 100 parts by weight of dehydrated polyhalite, this mixture boiled for a short time and subsequently filtered. It was found that this solution then contained approximately 57 parts by weight of potassium and magnesium sulphates per 100 parts by weight of water and this corresponds with the concentration of a saturated hot solution of potassium magnesium sulphate ($K_2Mg(SO_4)_2$).

It was thus found that heated or dehydrated polyhalite could be rapidly extracted with hot water, preferably in a counter-current process to obtain on the one hand a substantially saturated solution of the soluble salts potassium sulphate and magnesium sulphate, and on the other hand a residue of substantially pure gypsum.

Having thus set forth my invention, I claim:

1. The process of recovering potassium and magnesium sulphates which comprises heating polyhalite to a temperature of 500° centigrade, or higher, to dehydrate it and extracting the dehydrated mineral with hot water.

2. The process for recovering potassium and magnesium sulphates which comprises dehydrating polyhalite to remove its water of crystallization; and extracting the dehydrated mineral with hot water and producing thereby solutions containing essentially more than five (5) parts of anhydrous salts per one hundred (100) parts of water.

3. The process of treating polyhalite which consists in dehydrating the same to remove its water of crystallization; and treating the dehydrated mineral with hot water to produce solutions containing essentially more than five parts of anhydrous salts per one hundred parts of water.

4. The process for recovering potassium and magnesium sulphates containing essentially more than five parts of anhydrous salts per one hundred parts of water which consists in dehydrating polyhalite to remove its water of crystalliaztion; and extracting the dehydrated mineral with hot water.

In testimony whereof I affix my signature.

EUGENE P. SCHOCH.